UNITED STATES PATENT OFFICE.

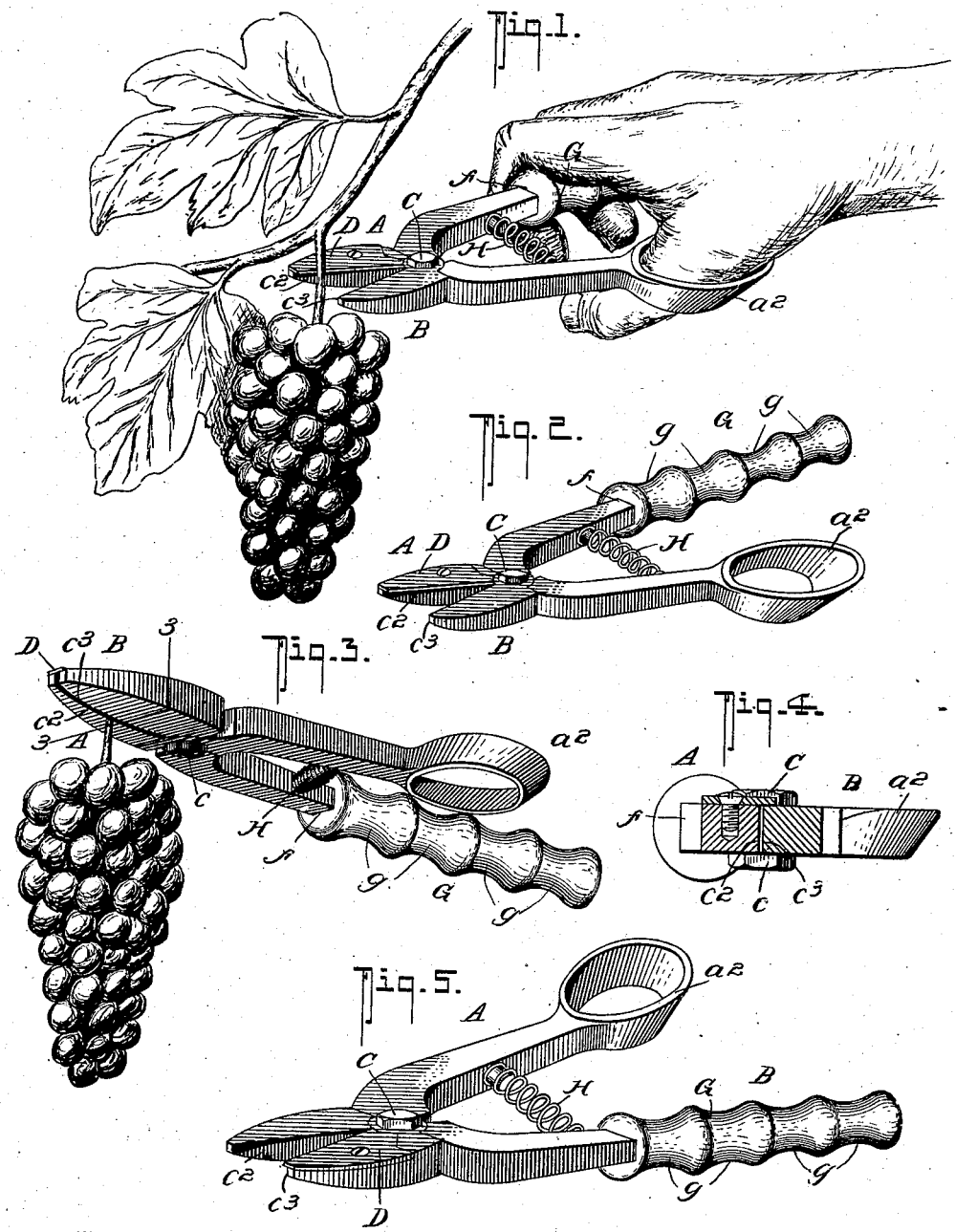

JAMES C. KING, OF CALLAHAN, CALIFORNIA.

FRUIT-CLIPPER.

No. 867,514.

Specification of Letters Patent.

Patented Oct. 1, 1907.

Application filed September 16, 1905. Serial No. 278,718.

*To all whom it may concern:*

Be it known that I, JAMES C. KING, residing at Callahan ranch, in the county of Siskiyou and State of California, have invented a new and Improved Fruit-Clipper, of which the following is a specification.

My invention seeks to provide a new and useful device or implement more especially designed for clipping grapes and generally, my invention comprises a scissors or pliers like body, the jaws of which are arranged, when closed over the stem of a cluster of grapes, to sever the stem and securely hold the cluster in such a manner that the same can be conveniently and with great care conveyed to the basket or receiver, and in which the several parts are so combined that the device can be manipulated with one hand and so arranged that no matter how the device is laid down the operator by sense of touch can properly grasp the same to effect the proper and desired operation of clipping the grape cluster.
In its subordinate features, my invention consists in the specific arrangement of parts hereinafter fully described and claimed and pointed out in the appended drawings in which:

Figure 1, is a view illustrating the manner in which my device is used. Fig. 2, is a perspective view of the device, the jaws being open, Fig. 3, is a similar view showing the jaws closed and as gripping the stem of a cluster of grapes. Fig. 4, is a cross section of the jaws taken substantially on the line 3—3 on Fig. 3. Fig. 5, is a view of my device constructed for a left handed man.

My fruit clipping device, in its general nature, has the shape of pliers, the two opposing members A and B of which are pivotally joined by fulcrum bolt or pin C secured by the nut $c$ that engages the threaded end of the pin C.

The jaws A and B have wide clamping faces $c^2$—$c^3$ to provide for firmly grasping the stem of the grape cluster so that the operator, after having closed the jaws, can firmly grip the stem to hold it in such manner that the fruit can be conveniently carried without the least danger thereto.

The handle portions of the two jaws are differentially formed and have such relation that the operator, no matter under what condition he may work in the vineyard, can quickly pick up the device in a proper shape to effect the desired severing of the fruit from the vine or bush and at the same time hold the cluster or fruit particles, after they shall have been severed, such position or holding of the device being absolutely necessary so that the stem cutter D secured to one jaw C and having a shearing action on the other jaw, will always be uppermost with respect to the stem to be severed.

The opposing jaw faces are alike and on the top of the
jaw A is secured, preferably fixed, the severing blade
D, the severing edge of which is parallel with the jaw to which it is attached and extends uniformly from the front to the rear ends of said gripping or clamping faces. The blade D may be made integral with the jaw C, but this I find not desirable as the blade D is usually of steel.
This blade D is preferably fastened to the jaw A and it is cut to the shape of the jaw to which it is attached and extends the full length of such jaw.

The cutting edge of the blade D projects uniformly at such a distance beyond the clamping face of the jaw A (see Fig. 4) to provide a long shearing blade and guard member that projects over and closes off the space between the jaw at the top and prevents the cut part of the stem on the cluster or bunch from crowding up above the top of the jaws.

The handle member of the jaw A is the shortest one of the two, and terminates with a thumb loop or ring $a^2$, while the handle member of the jaw B terminates in a tang adapted to firmly fit a socket $f$ in the front end of a wooden extension or handle piece G which is formed with a series of transverse grooves $g$ to provide for a free and firm grip of the fingers over said handle G, said handle G extending some distance beyond the thumb eyes or loop $a^2$.

By arranging the handle ends in the manner shown and described, it is apparent that the picker, by the sense of touch, can quickly grasp the device in a proper manner to bring the blade part of the jaws uppermost, since the said blade must be uppermost during the operation of severing the stem, otherwise the clamping faces of the two opposing jaws will not be in proper position to clamp the stem as it is cut.

To normally spread the jaws so they can be easily slipped over the stem, a stout coil spring H is disposed between the handle members near the fulcrum of said members.

From the foregoing, taken in connection with the drawings, the advantages and manner of using my device will be readily understood. It is manifest that the construction is such that the device can be economically made and readily carried in a hip pocket.

While my device is the more especially designed for clipping grapes, it may be conveniently used for clipping all kinds of fruit and roses.

The device shown in the drawing is intended to be used by the right hand. For a left handed clipper, the blade and the ring ends of the device are shaped as shown in Fig. 5.

Having thus described my invention, what I claim and desire to secure by Letters Patent, is:—

A fruit clipping device consisting of a pair of pivotal jaws having flat opposing stem clamping faces, one of the said jaws having a handle extension that terminates in a thumb receiving ring, the other jaw having a handle member that opposes and extends beyond the thumb engaging handle, its outer end having transverse corrugations for the fingers of the hand and a flat severing blade detachably supported on that jaw which has the thumb ring handle, said blade being mounted to project over the flat edge of the jaw to which it is attached and to extend over the top face of the opposing jaw when the two jaws are closed against the severed fruit stem, as set forth.

JAMES C. KING.

Witnesses:
C. E. MASON,
J. E. BAKER.